US008566019B2

United States Patent
Yokozawa

(10) Patent No.: US 8,566,019 B2
(45) Date of Patent: Oct. 22, 2013

(54) POSITIONING APPARATUS AND POSITIONING METHOD

(75) Inventor: Yukio Yokozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 317 days.

(21) Appl. No.: 12/942,935

(22) Filed: Nov. 9, 2010

(65) Prior Publication Data

US 2011/0112752 A1    May 12, 2011

(30) Foreign Application Priority Data

Nov. 10, 2009    (JP) .................................. 2009-256785

(51) Int. Cl.
  *G01C 21/00*    (2006.01)
(52) U.S. Cl.
  USPC ........................................................ 701/408
(58) Field of Classification Search
  USPC ......... 701/400, 408, 409, 412, 430, 439, 445, 701/446, 447, 468, 469, 472, 500
  See application file for complete search history.

(56) References Cited

U.S. PATENT DOCUMENTS

2009/0153362 A1*    6/2009    Goto et al. ................. 340/932.2

FOREIGN PATENT DOCUMENTS

| JP | 63-066413 A | 3/1988 |
|----|-------------|--------|
| JP | 02-216011 A | 8/1990 |
| JP | 05-172579 A | 7/1993 |
| JP | 08-068643 A | 3/1996 |
| JP | 09-089584 A | 4/1997 |
| JP | 11-083532 A | 3/1999 |
| JP | 2007-218627 A | 8/2007 |

OTHER PUBLICATIONS

Kitazawa et al. "Proposal for Map Matching Method on Personal Positioning System" (English) "Personal Positioning System (Japanese)" Published on Student Forum at G-Spatial EXPO <http://gi-studentjp.co.cc/s_forum/> since Oct. 2001.

* cited by examiner

*Primary Examiner* — Kim T Nguyen
(74) *Attorney, Agent, or Firm* — Kilpatrick Townsend & Stockton LLP

(57) ABSTRACT

A positioning apparatus includes: a first positioning unit that measures a position by receiving a signal; a second positioning unit that measures a position by autonomous navigation; and a memory unit that stores a positioning environment when the position is measured by the first positioning unit and the second positioning unit, wherein the first positioning unit and the second positioning unit measure the position based on the positioning environment.

6 Claims, 3 Drawing Sheets

| ROUTE \ POSITIONING DEVICE, ETC. | RFID | GPS | Wifi | LED | ACCELER-ATION | GYRO | BAROMETRIC PRESSURE | GEO-MAGNETISM | MAP | MOVEMENT HISTORY | ⋮ |
|---|---|---|---|---|---|---|---|---|---|---|---|
| NO. / ABBREVIATION | 01 | 02 | 03 | 04 | 05 | 06 | 07 | 08 | 09 | 10 | |
| NODE A / A | G(A01) | G(A02) | G(A03) | G(A04) | G(A05) | G(A06) | G(A07) | G(A08) | M(A) | R(A) | |
| LINK A-B / AB | G(AB01) | G(AB02) | G(AB03) | G(AB04) | G(AB05) | G(AB06) | G(AB07) | G(AB08) | M(AB) | R(AB) | |
| NODE B / B | G(B01) | G(B02) | G(B03) | G(B04) | G(B05) | G(B06) | G(B07) | G(B08) | M(B) | R(B) | |
| LINK A-C / AC | G(AC01) | G(AC02) | G(AC03) | G(AC04) | G(AC05) | G(AC06) | G(AC07) | G(AC08) | M(AC) | R(AC) | |
| NODE C / C | G(C01) | G(C02) | G(C03) | G(C04) | G(C05) | G(C06) | G(C07) | G(C08) | M(C) | R(C) | |
| LINK A-D / AD | G(AD01) | G(AD02) | G(AD03) | G(AD04) | G(AD05) | G(AD06) | G(AD07) | G(AD08) | M(AD) | R(AD) | |
| NODE D / D | G(D01) | G(D02) | G(D03) | G(D04) | G(D05) | G(D06) | G(D07) | G(D08) | M(D) | R(D) | |
| ... | | | | | | | | | | | |

FIG. 4

POSITIONING APPARATUS AND POSITIONING METHOD

BACKGROUND

1. Technical Field

The present invention relates to a positioning apparatus and a positioning method.

2. Related Art

Generally, in a method of acquiring position information by using a cellular phone, a GPS (Global Positioning System) is used, and the GPS is built in many cellular phones. In a place such as a building in a town or an indoor place in which the signal of the GPS is weak, it is difficult to automatically detect the position of a pedestrian carrying a cellular phone. As a method of solving such a problem, there is position measurement using autonomous navigation. As examples of technology relating to the autonomous navigation, there are JP-A-2-216011, JP-A-5-172579, JP-A-8-68643, JP-A-9-89584, JP-A-2007-218627, and "A Method of Map Matching for Personal Positioning Systems", National Measurement Technology Convention Student Forum, 2001.

In JP-A-2-216011, JP-A-5-172579, JP-A-8-68643, and JP-A-9-89584, the autonomous navigation is performed by calculating a distance of movement of a pedestrian or the direction in which the pedestrian moves based on the movement of the observed pedestrian. In "A Method of Map Matching for Personal Positioning Systems", National Measurement Technology Convention Student Forum, 2001, in order to eliminate error observed by the autonomous navigation, a map database is used in which a road network configured by nodes and edges and the boundaries and the areas of terrestrial objects located on the periphery thereof are represented. A correction method that is used when a pedestrian intersects with a peripheral boundary or when there is a big change in the direction of a pedestrian's body is proposed. In JP-A-2007-218627, in an environment in which a pedestrian normally moves within passages and enters into an area other than the passages at times, an apparatus that can calculate the movement history of a pedestrian with high accuracy by correcting the coordinates of the position of the pedestrian based on the pedestrian environment information, movement information acquired from the moving pedestrian, a pedestrian mode setting unit, and the like is proposed.

In JP-A-2-216011, JP-A-5-172579, JP-A-8-68643, JP-A-9-89584, JP-A-2007-218627, and "A Method of Map Matching for Personal Positioning Systems", National Measurement Technology Convention Student Forum, 2001, methods of positioning the current position, the movement history, or the like of a pedestrian by observing the movement of the pedestrian by using various sensors are proposed. However, there is no technology taking advantage of information such as defects in a positioning environment, which was experienced in the past when the position was measured, when the position is newly measured. Accordingly, when the position is measured under various environments, there is a concern that a decrease in the accuracy of measurement experienced in the past may be repeated.

SUMMARY

The invention can be implemented in the following forms or application examples.

Application Example 1

According to this application example of the invention, there is provided a positioning apparatus including: a first positioning unit that measures a position by receiving a signal; a second positioning unit that measures a position by autonomous navigation; and a memory unit that stores a positioning environment when the position is measured by the first positioning unit and the second positioning unit. The first positioning unit and the second positioning unit measure the position based on the positioning environment.

According to the positioning apparatus, the memory unit stores the positioning environment when the position is measured by the first positioning unit and the second positioning unit. Then, the first positioning unit and the second positioning unit measure the position based on the positioning environment. In the positioning environment, information representing the positioning environment at a time when the position was measured by the first positioning unit and the second positioning unit in the past is included. Accordingly, when a position is newly measured by the first positioning unit and the second positioning unit, the position can be measured in consideration of the positioning environment at the time when the position was measured in the past. When a position is measured under various environments, the position can be measured with higher accuracy in accordance with the positioning environment experienced in the past.

Application Example 2

According to this application example, in the positioning apparatus, the positioning environment is information on at least any one of a node or a link of a route when the position is measured by the first positioning unit and the second positioning unit.

According to this positioning apparatus, the positioning environment of at least one of a node or a link in which the positioning environment can be easily changed in the route is stored in the memory unit. Accordingly, the position can be measured by efficiently using the positioning environment.

Application Example 3

According to this application example, in the positioning apparatus, supply of power to the first positioning unit and the second positioning unit is controlled based on the positioning environment.

According to this positioning apparatus, the supply of power to the first positioning unit and the second positioning unit is controlled based on the positioning environment information. Thus, when the position is measured by the first positioning unit and the second positioning unit, the supply of power to a unit having low measurement accuracy is suppressed so as not to use the unit. Accordingly, the power consumption can be decreased.

Application Example 4

According to this application example, in the positioning apparatus, the memory unit further stores movement history of the route when the position is measured by the first positioning unit and the second positioning unit, and the first positioning unit and the second positioning unit measure the position based on the movement history.

According to this positioning apparatus, in the memory unit, the movement history acquired when the position was measured in the past by the first positioning unit and the second positioning unit is stored. Accordingly, when a position is newly measured by the first positioning unit and the second positioning unit, the position can be measured based on the movement history of the past. Therefore, the accuracy of determination regarding a route in which the current position is located is improved.

Application Example 5

According to this application example, in the positioning apparatus, the second positioning unit includes at least one of an acceleration sensor, an angular velocity sensor, a barometric pressure sensor, and a geomagnetic sensor.

According to this positioning apparatus, the position can be measured by performing the autonomous navigation by using at least one of the acceleration sensor, the angular velocity sensor, the barometric pressure sensor, and the geomagnetic sensor.

Application Example 6

According to this application example of the invention, there is provided a positioning method using a first positioning unit that measures a position by receiving a signal and a second positioning unit that measures a position by autonomous navigation. The positioning method includes: storing a positioning environment when the position is measured by the first positioning unit and the second positioning unit; and measuring the position by using the first positioning unit and the second positioning unit based on the positioning environment.

According to this positioning method, the positioning environment acquired when the position is measured by the first positioning unit and the second positioning unit is stored. Then, the first positioning unit and the second positioning unit measure the position based on the positioning environment. In the positioning environment, information representing the positioning environment at a time when the position was measured by the first positioning unit and the second positioning unit in the past is included. Accordingly, when a position is newly measured by the first positioning unit and the second positioning unit, the position can be measured in consideration of the positioning environment at the time when the position was measured in the past. When a position is measured under various environments, the position can be measured with higher accuracy in accordance with the positioning environment experienced in the past.

BRIEF DESCRIPTION OF THE DRAWINGS

The invention will be described with reference to the accompanying drawings, wherein like numbers reference like elements.

FIG. 4 is a diagram showing an example of estimated gain information that is acquired at a spot of node A.

DESCRIPTION OF EXEMPLARY EMBODIMENTS

A positioning apparatus according to an embodiment of the invention will be described with reference to the accompanying drawings.

Functional Configuration of Positioning Apparatus

The functional configuration of a positioning apparatus according to this embodiment will now be described.

Figure 1:
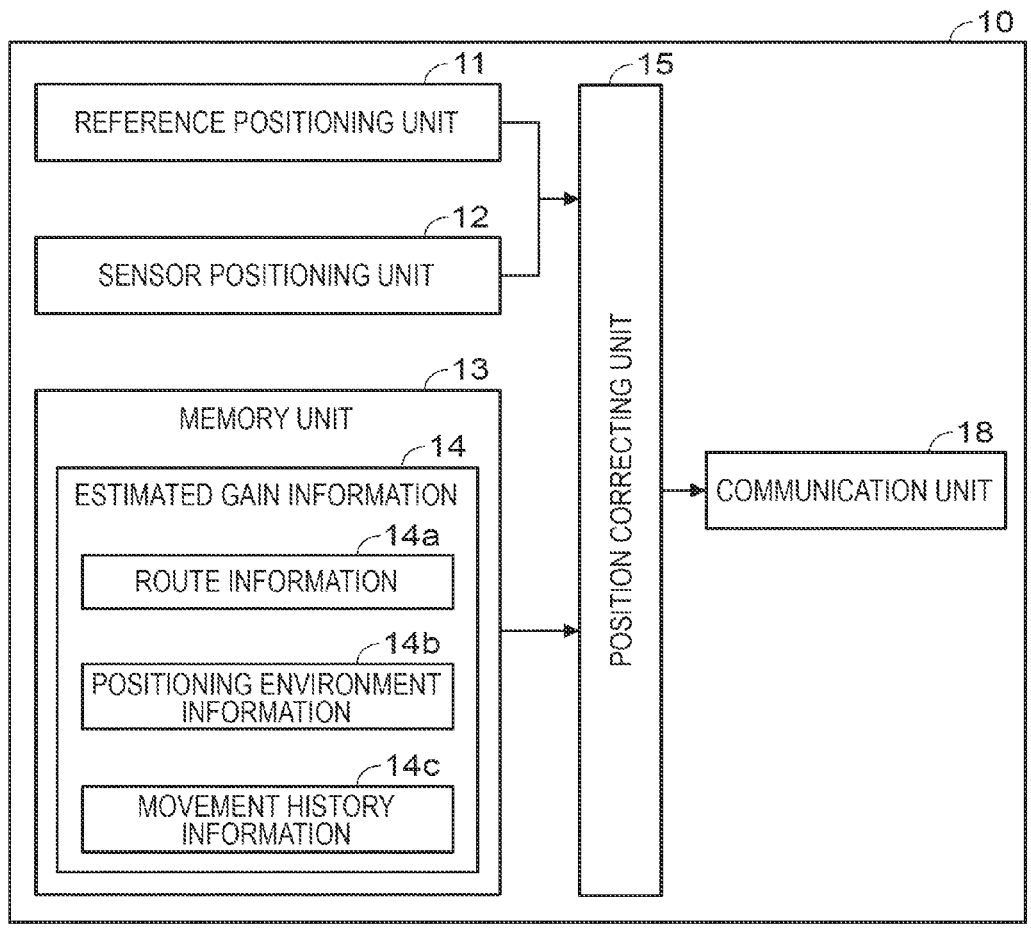
FIG. 1 is a block diagram showing the functional configuration of a positioning apparatus according to an embodiment of the invention.

FIG. 1 is a block diagram showing the functional configuration of the positioning apparatus 10 according to this embodiment. The positioning apparatus 10 has a reference positioning unit 11 as a first positioning unit, a sensor positioning unit 12 as a second positioning unit, a memory unit 13, a position correcting unit 15, a communication unit 18, and the like.

The reference positioning unit 11 receives a position information signal from the outside thereof and measures the current position of a user wearing the positioning apparatus 10. As a method of measuring the current position, in this embodiment, a method of measuring the position by receiving a position information signal from a GPS (Global Positioning System) satellite and analyzing a navigation message included in the position information signal, a method of measuring the position through short-range wireless communication such as RFID (Radio Frequency Identification) or Wifi, or a method of measuring the position by using an LED that emits illumination light may be used.

However, the method of receiving the position information signal is not limited thereto, and another method such as a method in which position information is acquired based on a camera image may be used.

The sensor positioning unit 12 estimates the current position and azimuth of a user wearing the positioning apparatus 10 by performing autonomous navigation based on values measured by various sensors. As the various sensors, an acceleration sensor that detects the acceleration of a vertical movement, a horizontal movement, and the like that accompanies the user's walking, a gyro sensor that detects a user's moving direction by detecting the angular velocity as an angular velocity sensor, a barometric pressure sensor that detects the altitude of a place in which a user is located, and a geomagnetic sensor that detects the direction of a user's body by detecting a geomagnetic vector may be used.

However, the various sensors are not limited to a combination of the above-described sensors. Thus, only some of the above-described sensors may be used, and a sensor of different type may be used.

The memory unit 13 is a non-volatile memory such as an EEPROM (Electrically Erasable Programmable Read-Only Memory) or a flash memory. In the memory unit 13, estimated gain information 14 that is configured by route information 14a, positioning environment information 14b, and movement history information 14c is stored. When the position is measured by the reference positioning unit 11, a position information signal of any one of the GPS, the RFID, the Wifi, and the LED is determined to be used based on this estimated gain information 14. When the position is measured by the sensor positioning unit 12, the type of a sensor to be used is determined.

In the route information 14a, information on routes on a map is registered in advance. In the positioning environment information 14b, information on positioning environments at a time when the positions were measured in the past by the reference positioning unit 11 and the sensor positioning unit 12 is registered. This positioning environment information 14b is associated with positioning spots on the routes included in the route information 14a. The information to be registered in the positioning environment information 14b may be registered as a default value in advance when a product to which the positioning apparatus 10 is mounted is shipped. When a user walks on a route on the map so as to measure the position, information on the positioning environment at that time may be configured to be registered. In the movement history information 14c, a history of a route on which a user moves is registered.

The positioning environment information 14b of each route is not only acquired from the history but is provided as a default value, and the positioning environment information 14b can be optimized by the individual's passage history. By using the communication unit, the latest positioning environment information 14b can be acquired from other persons (going ahead or coming in the opposite direction) passing through the same route.

The position correcting unit 15 calculates the current position of a user wearing the positioning apparatus 10 by performing correction based on the positioning data measured by the reference positioning unit 11 and the sensor positioning unit 12 by using a Karman filter or the like.

The communication unit 18 transmits the current position of the user wearing the positioning apparatus 10, which is calculated through correction performed by the position correcting unit 15, to another device.

Operation of Positioning Apparatus

Figure 2:
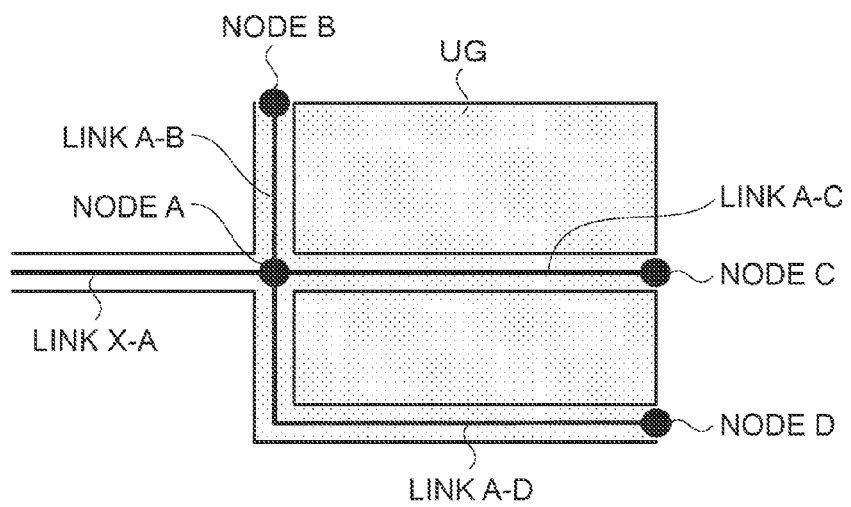
FIG. 2 is a map showing an example of a movement route of a user wearing the positioning apparatus.

The operation of the positioning apparatus 10 will now be described. FIG. 2 is a map showing an example of a movement route of a user wearing the positioning apparatus 10. A node spot represents a spot at which routes on the map intersect with each other, are joined together, or are divided. A link represents a route linking node spots. A link X-A shown in the figure is an outdoor route, and links A-B, A-C, and A-D, which are located in a hatched portion, represent routes in an underground mall UG. In this embodiment, an example, in which a user moves along a route of the link X-A through walking, arrives at the spot of a node A, then, walks down to the underground mall UG, and moves along the route of the link A-C, will be described.

Figure 3:
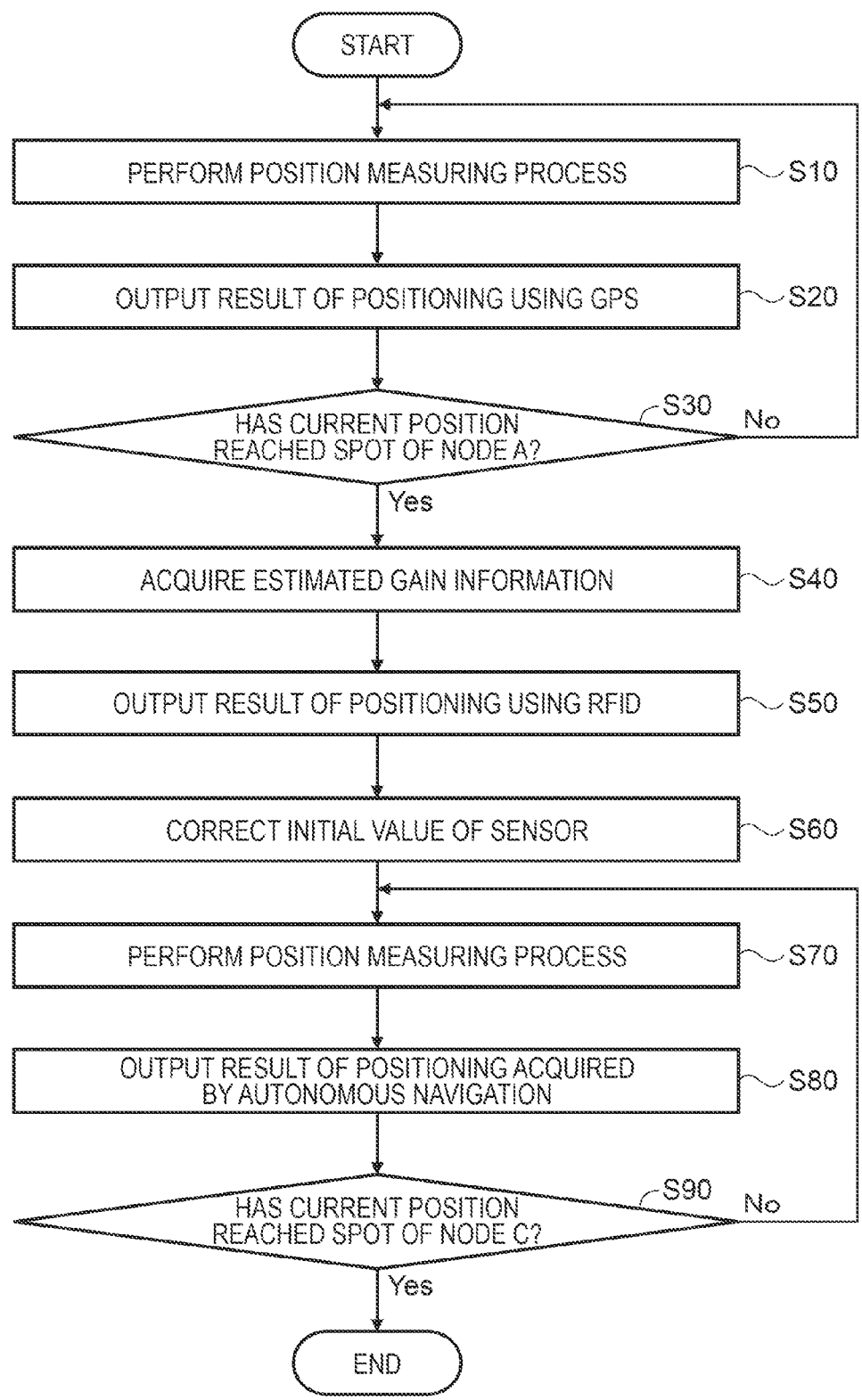
FIG. 3 is a flowchart showing an example of the operation of the positioning apparatus.

FIG. 3 is a flowchart showing an example of the operation of the positioning apparatus 10. This operation is performed by a control unit, which is not shown in the figure, having a CPU (Central Processing Unit), a RAM (Random Access Memory), a ROM (Read Only Memory), and the like.

At the start time point shown in FIG. 3, for example, the positioning apparatus 10 is worn on the side of the user's waist. The user wearing the positioning apparatus 10 is assumed to be in the middle of movement along the route of the link X-A toward the spot of the node A.

The positioning apparatus 10 performs a position measuring process of the current position of the positioning apparatus 10 by using the reference positioning unit 11 and the sensor positioning unit 12 (Step S10). Since, the route of the link X-A is outdoors, the result of positioning using the GPS is used.

The positioning apparatus 10 outputs the result of correction of the position measurement data of the GPS performed by the position correcting unit 15, that is, the information on the current position of the user wearing the positioning apparatus 10 to an external device, by using the communication unit 18 (Step S20).

The positioning apparatus 10 determines whether or not the current position of the positioning apparatus 10 that is measured in Step S10 has reached the spot of the node A shown in FIG. 2 (Step S30). When the current position of the positioning apparatus 10 is determined to have reached the spot of the node A (Step S30: Yes), the process proceeds to the next Step S40.

On the other hand, when the current position of the positioning apparatus 10 is determined not to have reached the spot of the node A (Step S30; No), the process returns to Step S10, and the position measuring process using the GPS is continued. In the middle of the user's movement along the route of the link X-A, the position measuring process using the GPS and output of the result of the position measuring process are continued.

The determination on whether or not the current position of the positioning apparatus 10 has reached the spot of the node may be performed based on determining on whether or not the current position of the positioning apparatus 10 has reached a position near the spot of the node without precisely determining whether or not the current position has reached the spot of the node.

The positioning apparatus 10 acquires the estimated gain information 14 that is stored in the memory unit 13 (Step S40).

FIG. 4 is a diagram showing an example of the estimated gain information 14 that is acquired at the spot of the node A. In the figure, the identification of gain information acquired by each positioning device (the RFID, the GPS, the Wifi, or the like) and the identification of the route information (MAP) and the movement history information at the spot of each node and in the route of each link are shown.

The gain information at the spot of each node or in the route of each link represents the reliability evaluation of the environment for receiving a position information signal or the reliability evaluation of the sensing environment for each positioning device. For example, in the case of the GPS, the reliability evaluation is degraded in a place, in which the influence of multiple paths is high, such as an indoor place. On the other hand, in the case of the geomagnetic sensor, the reliability evaluation is degraded inside a metal structure or the like due to a geomagnetic disturbance.

For example, the route information (MAP) of the spot of each node or the route of each link includes information indicating branching from the spot of the node A in three directions in the identification M(A) of the spot of the node A. For example, the movement history information conserves information indicating user's movement from the spot of the node A along the route of the link A-C in the past in the identification R(A) of the spot of the node A. This movement history information can be used as a part of the information used for estimating the route of the link selected by the user when the user's current position is calculated. In the movement history information, unique information of the users may be used by being weighted. In addition, information used for comparing the movement speeds in the routes of the links may be added as the movement history information, so that the route of the link selected by the user can be estimated.

The positioning apparatus 10 outputs the result of correction for the position measurement data of the RFID that is performed by the position correcting unit 15, that is, the information on the current position of the user wearing the positioning apparatus 10, to an external device by using the communication unit 18 (Step S50). The positioning apparatus 10 determines that the position measurement result of the RFID is the most accurate at the spot of the node A and has a high reliability evaluation based on the estimated gain information 14 acquired in Step S40, and selects the position measurement result acquired by using the RFID.

The positioning apparatus 10 corrects initial values of the acceleration sensor, the gyro sensor, the barometric pressure sensor, and the geomagnetic sensor based on the estimated gain information 14 acquired in Step S40 (Step S60). The correction of the initial values is performed in accordance with the environment states for the positioning apparatus 10 such as a voltage, temperature, and the attitude for the various sensors by using the estimated gain information 14.

The positioning apparatus 10 performs a position measuring process for the current position of the positioning apparatus 10 by using the reference positioning unit 11 and the sensor positioning unit 12 (Step S70).

Then, the positioning apparatus 10 outputs the result of correction for the position measurement data according to the autonomous navigation that is performed by the position correcting unit 15, that is, information on the current position of the user wearing the positioning apparatus 10 to an external device by using the communication unit 18 (Step S80).

The positioning apparatus 10 determines that the position measurement result according to the autonomous navigation that is calculated based on the measurement data of various sensors is the most accurate at the spot of the node A and has a high reliability evaluation based on the estimated gain information 14 acquired in Step S40, and selects the position measurement result according to the autonomous navigation. By referring to the movement history information of the estimated gain information 14 in addition to the result of the autonomous navigation, the positioning apparatus 10 determines that the user is in the middle of movement along the route of the link A-C toward the spot of the node C.

The positioning apparatus 10 determines whether or not the current position of the positioning apparatus 10 that is measured in Step S70 has reached the spot of the node C (Step S90). When the current position of the positioning apparatus 10 is determined to have reached the spot of the node C (Step S90: Yes), the process ends. Otherwise, the estimated gain information 14 at the spot of the node C is acquired, and the position measuring process and the like are repeatedly performed.

When the current position has reached the spot of the node C, information acquired by performing error correcting calculation in accordance with the voltage, the temperature, the holding attitude, and the like of various sensors is used for estimating the moved position from the spot of the node C. When the current position approaches the spot of the node C, supply of power to various sensors can be controlled by using the estimated gain information 14 of the spot of the node C. At the spot of the node C, it is determined that position error through the RFID, the GPS, and the Wifi is small. Accordingly, such control of the circuits and the calculation is optimized, and when the current position reaches the spot of the node C, accurate (about 2 meters) position information can be acquired by performing a position measuring process by using the GPS. Therefore, the position information and the gain information that are acquired by estimating the position in the route of the link A-C can be corrected. At this time, by performing back forward feedback for the estimated gain information 14 used in the route of the link A-C, such values can be further optimized.

On the other hand, when the current position of the positioning apparatus 10 is determined not to have reached the spot of the node C (Step S90; No), the process returns to Step S70, and the position measuring process according to the autonomous navigation is continued. In the middle of the user's movement along the route of the link A-C, the position measuring process according to the autonomous navigation and output of the result of the position measuring process are continued.

In this embodiment, based on the estimated gain information 14 that represents the positioning environment of the spot of each node and the route of each link in the past, the method of acquiring a position information signal from the outside is selected, and the sensor type used in the autonomous navigation is selected.

Accordingly, in the case of the GPS, by referring to the estimated gain information 14, it can be determined that the evaluation of the reliability of the position measurement through the GPS is low and accurate information cannot be acquired in the underground mall UG. In addition, by appropriately controlling the GPS sensor and a calculation interval, the power consumption can be decreased. Even in the underground mall UG, by using an IMES (Indoor Messaging System) or the like, indoor position measurement having a high reliability evaluation can be performed.

In the case of the Wifi, error information that remarkably changes in accordance with the installation status of a base station can be acquired by referring to the estimated gain information 14. Accordingly, the Wifi can be effectively used. When it is clear that a Wifi signal cannot be used based on the estimated gain information 14, a Wifi reception circuit can be controlled so as not to be used.

Under an environment in which a position information signal can be received from illumination of an LED installed in the underground mall UG, information representing a high reliability evaluation (error of several meters) can be acquired based on the estimated gain information 14 of the LED. Accordingly, an LED information reception circuit can be appropriately controlled.

A sensor having a high degree of error depending on the environment such as a geomagnetic sensor or a barometric pressure sensor can be used by determining the effectiveness thereof by referring to the estimated gain information 14. For example, when information representing a normal state (the number of disturbing objects is small, and the reliability evaluation is high) in the route of the link A-C of the estimated gain information 14 is acquired for a geomagnetic sensor, the measurement data thereof can be used. When information representing a high degree of error (low evaluation of reliability due to the sealing state in the underground mall) is acquired for a barometric pressure sensor, the contribution of the measurement data thereof to the position measuring calculation can be decreased.

By acquiring the estimated gain information 14 associated with the spot of each node and the route of each link, a position measuring method can be selected in accordance with the environment in which the user is located. When position measurement is performed under various environments, the position measurement can be performed with higher accuracy in accordance with the positioning environment experienced in the past. In addition, since each sensor can be operated in an appropriate situation, the power consumption can be decreased, and miniaturization of the positioning apparatus 10 can be realized.

Modified Examples

By transferring the position information acquired from the above-described positioning apparatus 10 to a display apparatus such as a PC (Personal Computer), a PDA (Personal Digital Assistant), or an electronic paper apparatus, an electronic apparatus provided with a position guiding function can be implemented.

The above-described positioning apparatus 10 may be built in a card case used for housing Edy (registered trademark), Suica (registered trademark), or the like using Felica (registered trademark). Accordingly, as a user places the card case to a reader/writer device, for example, installed to a station, a street, or the like, the position information signal is received, whereby an accurate current position can be acquired. In addition, by including a display device in the card case, a position guiding terminal device can be implemented.

The entire disclosure of Japanese Patent Application No. 2009-256785, filed on Nov. 10, 2009 is expressly incorporated by reference herein.

What is claimed is:

1. A positioning apparatus comprising:
a first positioning unit that measures a first position by receiving a signal;

a second positioning unit that estimates a second position by autonomous navigation; and a memory unit that stores a positioning environment when the first position is measured by the first positioning unit and when the second position is estimated by the second positioning unit, wherein the positioning environment includes gain information that represents a reliability evaluation of an environment for receiving the signal or a reliability evaluation of a sensing environment for the second positioning unit, and further wherein the first positioning unit and the second positioning unit measure a current position based on the positioning environment.

2. The positioning apparatus according to claim 1, wherein the positioning environment is information on at least any one of a node or a link of a route when the first position is measured by the first positioning unit and when the second position is estimated by the second positioning unit.

3. The positioning apparatus according to claim 1, wherein supply of power to the first positioning unit and the second positioning unit is controlled based on the positioning environment.

4. The positioning apparatus according to claim 1,
wherein the memory unit stores movement history of the route when the first position is measured by the first positioning unit and when the second position is estimated by the second positioning unit, and wherein the first positioning unit and the second positioning unit measure the current position based on the movement history.

5. The positioning apparatus according to claim 1, wherein the second positioning unit includes at least one of an acceleration sensor, an angular velocity sensor, a barometric pressure sensor, and a geomagnetic sensor.

6. A positioning method using a first positioning unit that measures a first position by receiving a signal and a second positioning unit that estimates a second position by autonomous navigation, the positioning method comprising:

storing a positioning environment when the first position is measured by the first positioning unit and when the second position is estimated by the second positioning unit; and calculating a current position by using the first positioning unit and the second positioning unit based on the positioning environment, wherein the positioning environment includes gain information that represents a reliability evaluation of an environment for receiving the signal or a reliability evaluation of a sensing environment for the second positioning unit.

* * * * *